US005110457A

United States Patent [19]

Krawl et al.

[11] Patent Number: 5,110,457

[45] Date of Patent: May 5, 1992

[54] ORE SAMPLE AND WATER RECOVERY APPARATUS AND METHOD THEREFOR

[76] Inventors: Randy Krawl, 2813 N. 29th St., Boise, Id. 83703; Matt Stramel, 965 Highland, Elko, Nev. 89801

[21] Appl. No.: 430,720

[22] Filed: Nov. 1, 1989

[51] Int. Cl.[5] .............................................. B01D 21/26

[52] U.S. Cl. .................................... 210/787; 210/788; 210/806; 210/257.1; 210/259; 210/295; 210/416; 210/512.1; 209/17; 209/144; 209/211; 209/250; 209/254; 209/506

[58] Field of Search ...................... 210/257.1, 259, 294, 210/295, 384, 388, 416.1, 512.1, 785, 787, 788, 806; 209/17, 250, 254, 211, 144, 506; 175/206, 207

[56] References Cited

U.S. PATENT DOCUMENTS

| | | | |
|---|---|---|---|
| 3,016,962 | 1/1962 | Lummus et al. | 209/211 |
| 3,860,019 | 1/1975 | Teague | 210/167 |
| 4,071,143 | 1/1978 | Richan | 209/506 |
| 4,696,353 | 9/1987 | Elmquist et al. | 175/206 |

*Primary Examiner*—Robert A. Dawson
*Assistant Examiner*—David Reifsnyder
*Attorney, Agent, or Firm*—Frank J. Dykas; Craig M. Korfanta; Ken J. Pedersen

[57] ABSTRACT

A method and apparatus for preparing an ore sample and recovering water from a drilling rig is disclosed. Ore sample and water recovery apparatus (10) includes a slurry inlet (12) for receiving slurry from a drilling rig. Slurry is directed from slurry inlet (12) to a diffuser chamer (13) which includes an abrasion-resistant, rubbercoated diffuser (14) and a slurry converger (16). Slurry is then directed through a first vibrating sieve screen (21) which separates large particles from the slurry and directs them directly into sample tank (58). The slurry is passed on to a second vibrating sieve screen (22) which screens out progressively smaller sized particles and directs them into sample tank (58). The reminaing slurry is directed into a slurry basin (26) and infused into a hydraulic carrier medium of water using jet pump infuser (34). The slurry is then directed into cyclone separator (48) which extracts the remaining particles from the slurry and directs them into sample tank (58). The extracted and purified water is directed into a recovered water reservoir (64). The recovered water reservoir (64) is periodically emptied into a secondary storage tank using a second hydraulic water pump (66).

14 Claims, 2 Drawing Sheets

ORE SAMPLE AND WATER RECOVERY APPARATUS AND METHOD THEREFOR

BACKGROUND OF THE INVENTION

1. Technical Field

This invention generally relates to mining exploration equipment and methods. In particular it relates to an apparatus and method, to be used infield for preparing ore samples and recovering water for reuse.

2. Background Art

Current day practice in mineral exploration uses truck mounted reverse flow or dual tube drilling rigs to extract subsurface samples for mineral content analysis. The reverse flow drilling process requires that drilling fluid be pumped down the outer tube of the drill and returned to the surface, along with the drill cuttings, up through the inner tube. In the early stages of drilling, compressed air is used as the fluid. As soon as the cuttings become moist, water is pumped down the drill shaft, and the cuttings are brought up in a slurry. For this reason, a tanker truck always follows the drilling rig to supply the necessary water. Once the drill has consumed all of the water in the tanker truck, drilling must be either slowed or stopped until the tanker truck is able to locate a water source and refill. For a typical fourteen hour drilling day, this translates into about two hours of down time waiting for water. This is obviously a significant problem.

There are also environmental concerns associated with the tanker trucks combing the countryside to refill out of a local stream or pond, providing they can even locate a water source. In some cases, the water shortage problem is so bad that drillers have resorted to flying water into remote locations with helicopters. This is very expensive and inconvenient.

Once the cuttings have been brought to the surface, they are examined and logged by geologists to determine their mineral content. The cuttings are brought to the surface in large amounts of slurry. Consequently, in order for the geologist to examine the fine cuttings, he or she must retain and dry large quantities of the slurry. This is typically accomplished by applying samples to drying boards and allowing the water to evaporate off. The samples on the drying boards must also be catalogued in chronological order to maintain the integrity of the analysis.

LUMMUS, ET AL., U.S. Pat. No. 3,016,962, teaches a partial solution to this problem. Lummus uses a process and apparatus in which the slurry from the drilling well is introduced directly into a hydrocyclone. The hydrocyclone separates the drilling fluid from the cuttings and directs the fluid to a storage tank so that it can then be reused in the drilling process. Lummus does not teach, nor make any special provisions for, maintaining the integrity of the cutting sample. Lummus' sole concern is with water recovery. Also, the bit cuttings introduced into the hydrocyclone cannot exceed a maximum size as this results in clogging of the hydrocyclone apex. Additionally, particles below a particular minimum size are rejected in the recovered water stream and sent back down the drill or settled out in the storage tank. This particular method and apparatus produces an unacceptable ore sample for the geologist. In order to make a valid assessment of the sample, the sample must contain both large and small particles. Additionally, the samples must be taken in a batch manner to insure the integrity of any stratification layer analysis.

In the past, mining companies have made the decision not to mine a specific site based upon the erroneous finding that there was insufficient mineral content in the drilling samples. The erroneous findings result from the rejection of the fine particles contained in the recovered water and/or discarded drilling mud. It only takes 0.03 ounces of gold per ton of ore to justify mining a particular site. It is easy to see how present day drilling methods and those shown in the prior art result in a significant amount of the mineral going undetected.

Using the method taught by Lummus, the intermediate particles filtered out by the hydrocyclone are separated from any small particles, either settling out in the storage tank or being reinjected down the drilling shaft, along with the larger prescreened particles, which have to be removed from the drilling fluid before it is introduced into the hydrocyclone to prevent clogging of the apex. The end result is that the geologist is presented with three separate samples with little or no chronological correlation, including an incomplete small particle sample.

What is needed is an apparatus and method for batch ore sampling and water recovery which can be used in the field by the drilling rig operator and easily transported from one drilling site to another. It is therefore an object of the present invention to provide such a method and apparatus.

DISCLOSURE OF INVENTION

These and other objects are accomplished by an ore sample preparation and water recovery apparatus and method which includes: first diffusing the flow of incoming ore and drilling fluid through a series of one or more diffusers; secondly, separating any large ore particles from the drilling fluid and incoming ore and directing the particles directly into the sample tank; thirdly, infusing the remaining smaller ore particles and drilling fluid into a hydraulic carrier medium and introducing the medium into a cyclone separator which subsequently extracts the remaining ore and deposits it into the sample tank and directs the recovered water into a separate storage tank.

The diffuser generally consists of an abrasion-resistant rubber coated baffle which absorbs the impact of the incoming fluid and ore particles. The sample is then passed through a series of screens which separate the larger particles from the remaining slurry and directs them directly into the sample tank.

The remaining slurry is directed into a converging slurry basin. Water jets then wash the slurry into a jet pump infuser which infuses the slurry into a hydraulic carrier medium, typically water. The slurry and hydraulic carrier medium are then introduced into a cyclone separator. The cyclone separator extracts the remaining ore sample and deposits it into the sample tank while the recovered water overflow is directed into a separate storage tank. The cyclone separator of the present invention is capable of extracting sample particles down to 44 microns, thereby guaranteeing an accurate mineral content assessment.

An access panel is provided in the bottom of the sample tank for extracting the ore sample from the slurry. Upon activation of the access panel, the cyclone separator is automatically emptied and washer jets rinse the sample tank thereby maintaining the integrity of each batch sample.

The water storage tank is provided with a float system such that when the water level reaches a predetermined level, the water is subsequently pumped to a secondary storage tank, i.e. the tanker truck, using a secondary centrifugal pump. The secondary pump also supplies water wash down jets in the slurry chute and sample tank areas. A primary water pump is provided for supplying the infuser and the water jets in the diffuser, vibrating screen, and slurry basin areas, thereby facilitating flow of the sample through the apparatus.

Advantageously, the water pumps are hydraulically powered by a hydraulic takeoff from the drilling rig. The hydraulic lines, which inherently radiate heat, are passed through a conduit within the storage tank, thereby providing a heating source to the apparatus to prevent freezing during cold weather use. Additionally, the access panel and the vibrating screens are hydraulically powered via a hydraulic takeoff from the drilling rig.

The entire apparatus is housed within a suitable housing and mounted directly on the drilling rig, or in the alternative, on a trailer frame, so that it is conveniently transported from one drilling site to another.

BEST MODE FOR CARRYING OUT INVENTION

Figure 1:
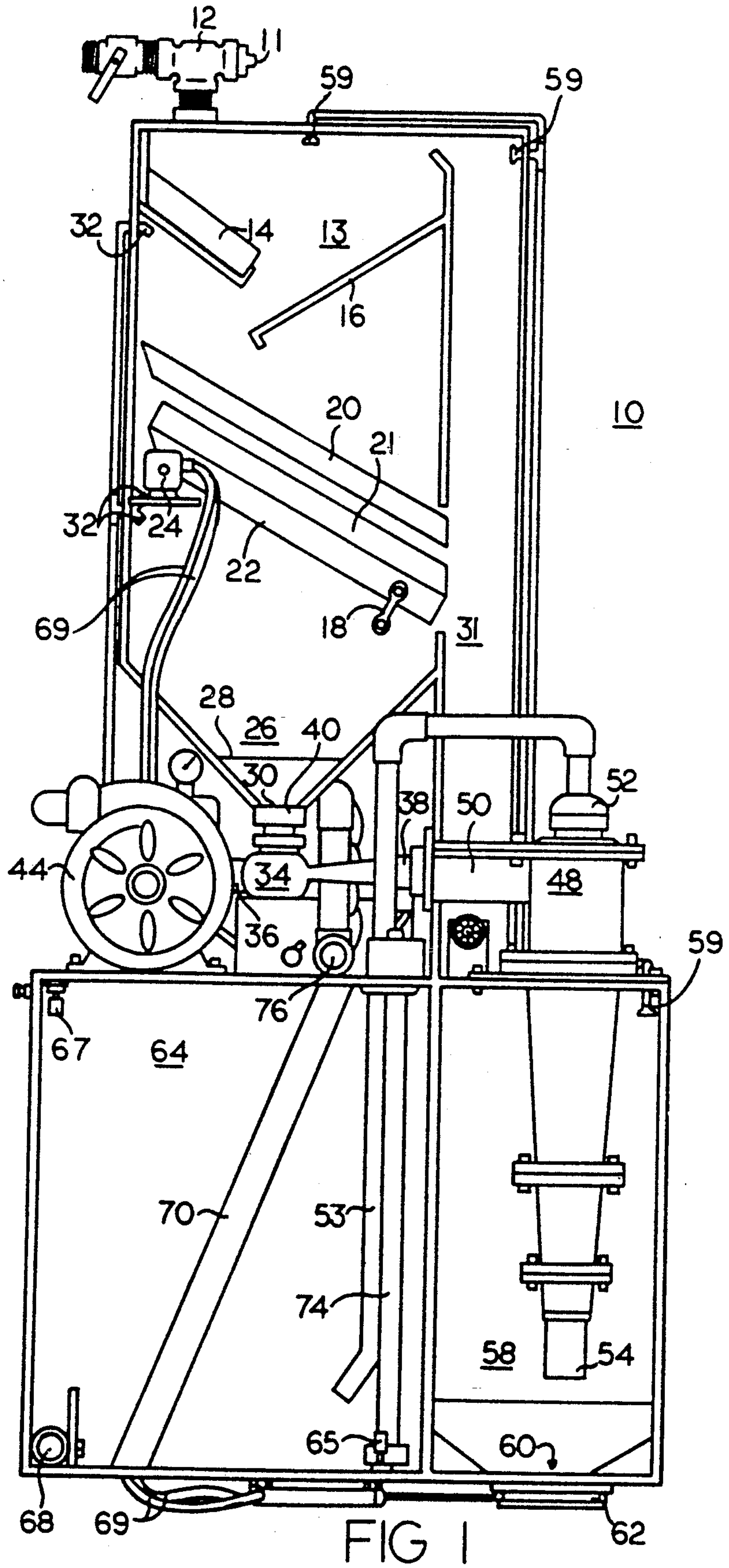
FIG. 1 is a front side cut away of the ore sample and water recovery apparatus.
Figure 2:
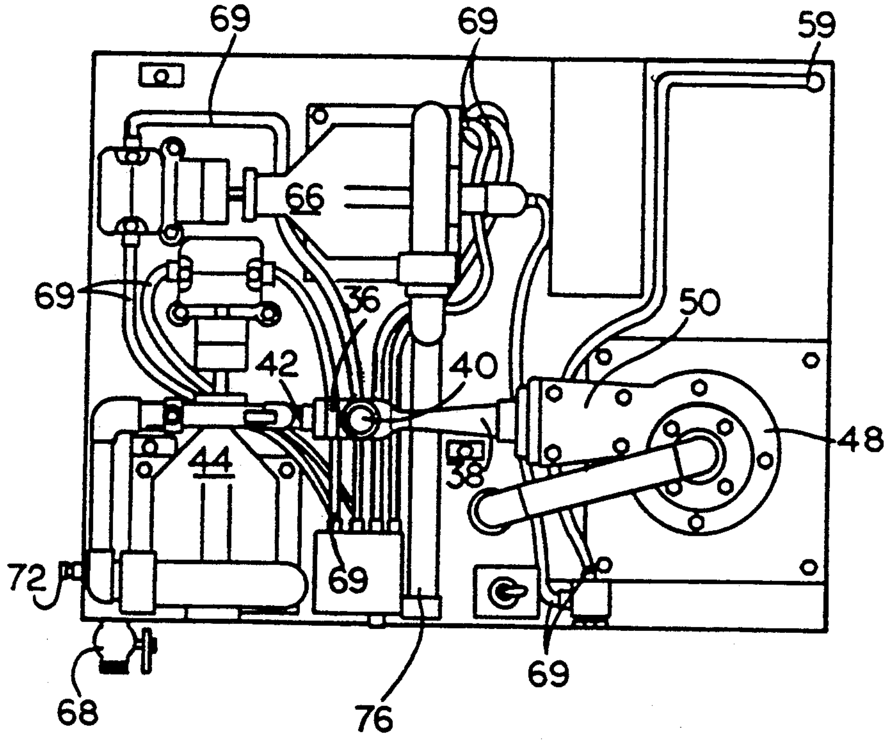
FIG. 2 is a top side view of the ore sample and water recovery apparatus with the structure above jet pump infuser being removed for the purposes of illustration.

Referring now to FIGS. 1 and 2, ore sample and water recovery apparatus 10 is shown. Ore sample and water recovery apparatus 10 can easily be retrofitted to any drilling rig and transported to the drilling site or mounted on a separate trailer, neither of which are shown.

Typically, slurry from a rotary mining exploration drilling rig is introduced into ore sample and water recovery apparatus 10 through slurry inlet 12 which consists of a ball valve connected to a T-fitting having a blow out plug 11 in one end. Blow out plug 11 acts as an inlet deflector which directs the slurry. The slurry is then directed out the bottom of the T-fitting into diffuser chamber 13. An abrasion-resistant rubber coated diffuser 14 is attached within diffuser chamber 13 and acts to absorb the impact of the bit cuttings contained in the slurry. A second baffle 16 and a plurality converging flanges 20 are fitted within the bottom of diffuser chamber 13 and act both as secondary diffusers and a means for directing the slurry.

The slurry is directed to a first vibrating sieve screen 21. A second vibrating sieve screen 22 is located directly below the first stationary sieve screen 2 and has a progressively smaller sieve size. The series of screens 21 and 22 serves to separate the larger chunks of sample and direct them directly into sample tank 58. In this particular embodiment particles larger than 1/16" are directed directly into sample tank 58, through slurry chute 31, while the smaller particles are passed by sieve screens 21 and 22. First and second sieve screens 21 and 22 are disposed at an incline to promote direction of particles into slurry chute 31.

Vibrating sieve screens 21 and 22 receive their vibrating motion from hydraulic vibrator 24, which is generally powered from a hydraulic takeoff line from the drilling rig. Hydraulic vibrator 24 here consists of an eccentric hydraulically-driven shaft which is attached to one end of vibrating screens 21 and 22. The other end of vibrating screens 21 and 22 are attached to the slurry basin chamber walls via a pair of rocker arm assemblies 18.

The remaining slurry is then directed into slurry basin 26 which is disposed directly below first and second sieve screens 21 and 22. A slurry basin screen 28 is positioned within the converging end 30 of slurry basin 26. Slurry basin screen 28 is sized to prevent any oversized particles from being infused into jet pump infuser 34. The converging end 30 of slurry basin 26 is connected to the suction inlet 40 of jet pump infuser 34. A plurality of water wash down jets 32 are provided within diffuser chamber 13, next to first and second sieve screens 21 and 22 and in slurry basin 26 to facilitate the travel of the slurry throughout ore sample and water recovery apparatus 10.

Jet pump infuser 34 has its pressurized water inlet 36 connected to pressurized water supply line 42. A first hydraulic water pump 44 derives its water from a remote water tanker truck, not shown, to supply pressurized water supply line 42. The pressurized water from water supply line 42 flows through jet pump infuser 34 and creates a low pressure area within suction inlet 40. This low pressure area acts to infuse the slurry from slurry basin 26 through jet pump infuser 34 and subsequently out through slurry outlet 38. Slurry outlet 38 is connected to a slurry inlet 50 in cyclone separator 48.

Cyclone separator 48 is a vortex type separator and serves to separate the remaining bit cuttings from the water. The extracted water is directed into recovered water reservoir 64 through extracted water outlet 52 and extracted water spout 53. The extracted ore sample is directed into sample tank 58 through cyclone apex 54.

Sample tank 58 has a sample tank access and sample outlet 60 for removing the processed sample from the apparatus. Sample tank access 60 here consists of hydraulic ram operated sliding panel 62. Upon activation of hydraulic ram operated sliding panel 62, any extracted sample within sample tank 58 is released. Sanitary water wash down jets 59, which are disposed within sample tank 58, are then activated and serve to remove any sample residue from sample tank 58, thereby further maintaining present and subsequent sample integrity.

Recovered water reservoir 64 has a pair of water level indicators, low level float 65 and high level float 67. Low level float 65 serves as a shutoff for second water pump 66, while high level float 67 serves as an actuator to second water pump 66. Second water pump 66 draws the extracted water from water reservoir 64 through siphon tube 74. The water is then pumped back to the tanker truck through second pump outlet pipe 76. Water release valve 68 is disposed in a front side of recovered water reservoir 64 to provide a manual drain and clean out for the reservoir, while overflow outlet 72 provides protection against the reservoir overflowing.

Advantageously, the hydraulic lines 69, which supply hydraulic ram operated sliding panel 62, are routed through conduit 70. Conduit 70 runs through recovered water reservoir 64 such that the heat radiated from hydraulic lines 69 prevents the recovered water within recovered water reservoir 64 from freezing in cold weather operation.

While there is shown and described the present preferred embodiment of the invention, it is to be distinctly understood that this invention is not limited thereto but may be variously embodied to practice within the scope of the following claims.

We claim:

1. A method for preparing an ore sample and recovering water from a drilling rig which comprises the steps of:

separating large ore particles from wet ore by sieving and directing the large particles directly into a sample tank;

infusing the sieved wet ore into a hydraulic carrier medium of water;

extracting the water from the wet ore using a cyclone separator;

directing the extracted water into a storage tank;

directing the ore from the cyclone separator to the sample tank;

removing all of the ore from the sample tank; and cleaning any remaining residue from the sample tank.

2. The method of claim 1 wherein said separating step is accomplished by passing the ore sample through a plurality of sieve screens of progressively smaller size being disposed at an incline.

3. The method of claim 2 wherein said infusing step is accomplished by a jet pump infuser having a suction inlet disposed to receive the sieved wet ore produced from said separating step.

4. The method of claim 1 wherein said infusing step is accomplished by a jet pump infuser having a suction inlet disposed to receive the sieved wet ore produced from said separating step.

5. An apparatus for preparing an ore sample and recovering water from a drilling rig which comprises:

a diffuser for diffusing the flow of incoming ore from the drilling rig;

separating means for separating large ore particles from wet ore received from said diffuser and directing the separated large ore particles directly into a sample tank;

hydraulic water carrier means for receiving and transporting wet remaining smaller ore particles from said separating means;

infusing means for infusing the wet remaining smaller ore particles received from said separating means into said hydraulic carrier means;

extracting means for extracting the water from the hydraulic carrier means and the remaining smaller ore sample particles and directing the extracted water to a storage tank and the ore sample to a sample tank;

a storage tank for receiving the extracted water from the extracting means; and a sample tank for receiving ore from said separating means and said extracting means, said tank including access means for removing the ore sample from the sample tank.

6. The apparatus of claim 5 wherein said separating means comprises a series of sieve screens of progressively smaller sizes being disposed between said diffuser and said infusing means and to receive ore from said diffuser.

7. The apparatus of claim 6 wherein said hydraulic carrier means comprises a pressurized hydraulic water supply line being attached to the inlet of said jet pump.

8. The apparatus of claim 6 wherein said extracting means comprises a cyclone separator having an ore outlet apex and a water outlet.

9. The apparatus of claim 6 wherein said infuser means comprises:

a slurry basin, having a converging end, and being disposed to receive wet ore from said separating means; and a jet pump having an inlet, an outlet and a suction inlet, being operably attached at its suction inlet to the converging end of said slurry basin and to said extraction means at its outlet.

10. The apparatus of claim 9 wherein said extracting means comprises a cyclone separator having an ore outlet apex, a water outlet and a slurry inlet, wherein said slurry inlet is attached to the outlet of said jet pump infuser.

11. The apparatus of claim 5 wherein said extracting means comprises a cyclone separator having an ore outlet apex and a water outlet.

12. The apparatus of claim 5 wherein said infuser means comprises:

a slurry basin having a converging end, and being disposed to receive wet ore from said separating means; and a jet pump having an inlet, an outlet and a suction inlet, being operably attached at its suction inlet to the converging end of said slurry basin and at its outlet to said extraction means.

13. The apparatus of claim 12 wherein said extracting means comprises a cyclone separator having an ore outlet apex, a water outlet and a slurry inlet, wherein said slurry inlet is attached the outlet of said jet pump infuser.

14. The apparatus of claim 5 wherein said hydraulic carrier means comprises a pressurized hydraulic water supply line being attached to the inlet of said jet pump.

* * * * *